No. 800,408. PATENTED SEPT. 26, 1905.
L. C. SHARP.
MACHINE FOR FORMING AND ASSEMBLING CAN SECTIONS.
APPLICATION FILED JAN. 14, 1902.

WITNESSES:
H. Walker
H. Owens.

INVENTOR
Lee C. Sharp
BY
ATTORNEYS

No. 800,408. PATENTED SEPT. 26, 1905.
L. C. SHARP.
MACHINE FOR FORMING AND ASSEMBLING CAN SECTIONS.
APPLICATION FILED JAN. 14, 1902.

WITNESSES:
H. Walker
T. B. Owens.

INVENTOR
Lee C. Sharp
BY
ATTORNEYS

No. 800,408. PATENTED SEPT. 26, 1905.
L. C. SHARP.
MACHINE FOR FORMING AND ASSEMBLING CAN SECTIONS.
APPLICATION FILED JAN. 14, 1902.

UNITED STATES PATENT OFFICE.

LEE C. SHARP, OF OMAHA, NEBRASKA, ASSIGNOR TO AMERICAN CAN COMPANY, OF NEW YORK, N. Y., A CORPORATION OF NEW JERSEY.

MACHINE FOR FORMING AND ASSEMBLING CAN-SECTIONS.

No. 800,408.     Specification of Letters Patent.     Patented Sept. 26, 1905.

Application filed January 14, 1902. Serial No. 89,691.

*To all whom it may concern:*

Be it known that I, LEE C. SHARP, a citizen of the United States, and a resident of Omaha, in the county of Douglas and State of Nebraska, have invented a new and Improved Machine for Forming and Assembling Can-Sections, of which the following is a full, clear, and exact description.

This invention relates to an apparatus for forming and assembling the sections of cans, especially drawn can-sections, and it comprises automatic mechanism for fully performing this work with the exception of the dies or other mechanism for giving the can-sections their primary shape.

The invention is intended particularly and the machine here illustrated is designed for use in connection with the two-piece or one-seam can forming the subject-matter of my copending application, Serial No. 88,776, filed January 7, 1902.

This specification is an exact description of one example of my invention, while the claims define the actual scope thereof.

Reference is to be had to the accompanying drawings, forming a part of this specification, in which similar characters of reference indicate corresponding parts in all the views.

Figure 9:
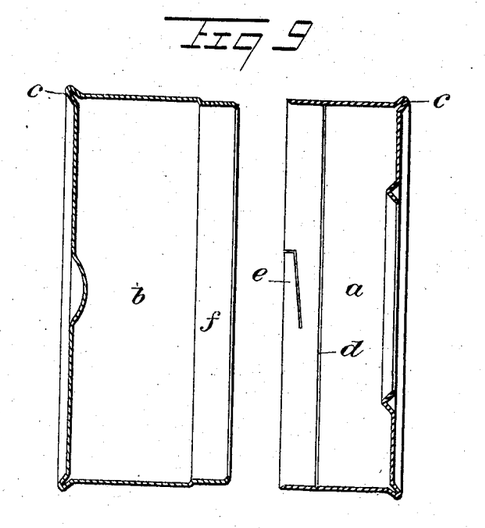
Figure 10:
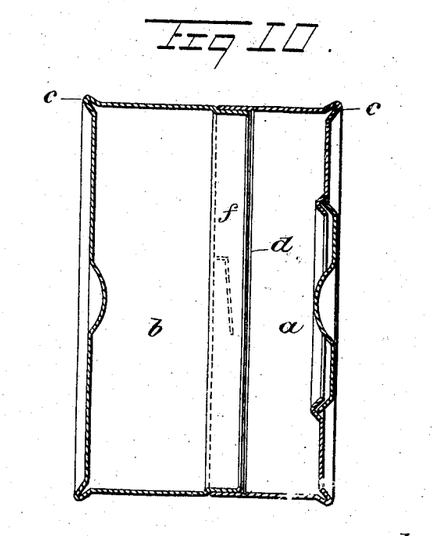

Referring to Figs. 9 and 10, the can which this machine is intended to form and assemble comprises (excepting the lid or cover) two sections $a$ and $b$, of which the section $a$ is the top section and $b$ the bottom section. These sections are drawn or stamped up into true cylindrical form by dies in the well-known manner, and these dies form no part of the present invention. After the cylindrical sections are placed in the machine the sections are each formed with swaged beads or ribs $c$, running around their top and bottom edges. An annular score or indentation $d$ is formed on the inside of the section $a$, and a starting or tearing tongue $e$ is formed in the lower edge thereof, while the section $b$ has an annular inwardly-swaged part $f$. These various operations—namely, the formation of the elements $c$, $d$, $e$, and $f$—are performed by my invention, and then the machine acts automatically to move the sections into engagement, as Fig. 10 shows, and finally to pass the can over a soldering device, so as hermetically to close the seam, the finished can being then ejected from the machine. For further information respecting the can see the copending application referred to.

12 indicates the frame of the machine, which may be of any form desired and on the top of which is supported a table, comprising an inclined major portion 14 and a horizontal or level minor portion 15. Mounted in boxes 16, carried rigidly by the table part 14, is a transverse drive-shaft 17, to which rotary motion is applied by means of a belt running over a pulley $17^a$. (See Fig. 6.) Located at the rear end of the machine and revolubly mounted in suitable boxes is a drive-shaft 18, having a pulley 19, over which a belt runs. The machine therefore has two drive-shafts to which motion is independently imparted, these shafts nevertheless working in a certain unison, as will appear hereinafter. Located in the framing under the table are two longitudinal shafts 20, arranged one at each side, and geared with the ends of the shaft 18 to turn therewith. From these shafts 17 and 20 movement is taken to run all of the operative parts of the machine.

On the inclined part 14 of the table two guideways or chutes are formed by vertical parallel walls 21 and 22. The chutes 21 are adapted to carry the bottom sections $b$ of the can, and the chutes 22 are adapted to carry the top sections $a$ of the can. These chutes may be of any length desired, and the cans are stacked therein, so as to be fed automatically to the machine by force of gravity. The can-sections pass down these chutes and the necessary operations are performed thereon. I will first describe the independent operations on the top section, then the independent operations on the bottom section, and finally the joint operations on the two sections. The chute 22 has a transverse break therein in line with the shaft 17, and located at each side of this break longitudinally of the chute are two stop-pins 23 and 24. These pins are guided in the table part 14 to move perpendicularly to the surface thereof, and consequently at a slight inclination to the baseline of the machine. They are carried respectively at the ends of a rocker-arm 25, and this rocker-arm is driven by a link 26, connected to a projection 27 of the arm 25, the link being driven from a crank-disk 28, attached to a bevel-gear 29, which meshes with a gear 30 on the right-hand shaft 20. Thus a regular rocking movement is imparted to the arm 25, and the pins 23 are caused to reciprocate alternately, one pin being raised above the surface of the table as the other pin is lowered beneath it. These pins 23 and 24 serve to maintain the stack or pile of can-sections in the chute and also to allow the can-sections to pass individually into the said break in the chute. Mounted to slide in boxes on top of the table-section 14 is a transverse shaft 31, which lies in line with and at the right-hand end of the shaft 17. This shaft 31 is given a regular reciprocal movement by a spring-pressed lever 32, connected with the shaft and bearing on a cam 33, mounted on the right-hand shaft 20. The inner end of the shaft 31 is tubulated and carries the shank 34 of a plunger-head 35, and behind this plunger is a spring 36, which normally holds the plunger-head yieldingly projected beyond the end of the shaft 32.

Figure 6:
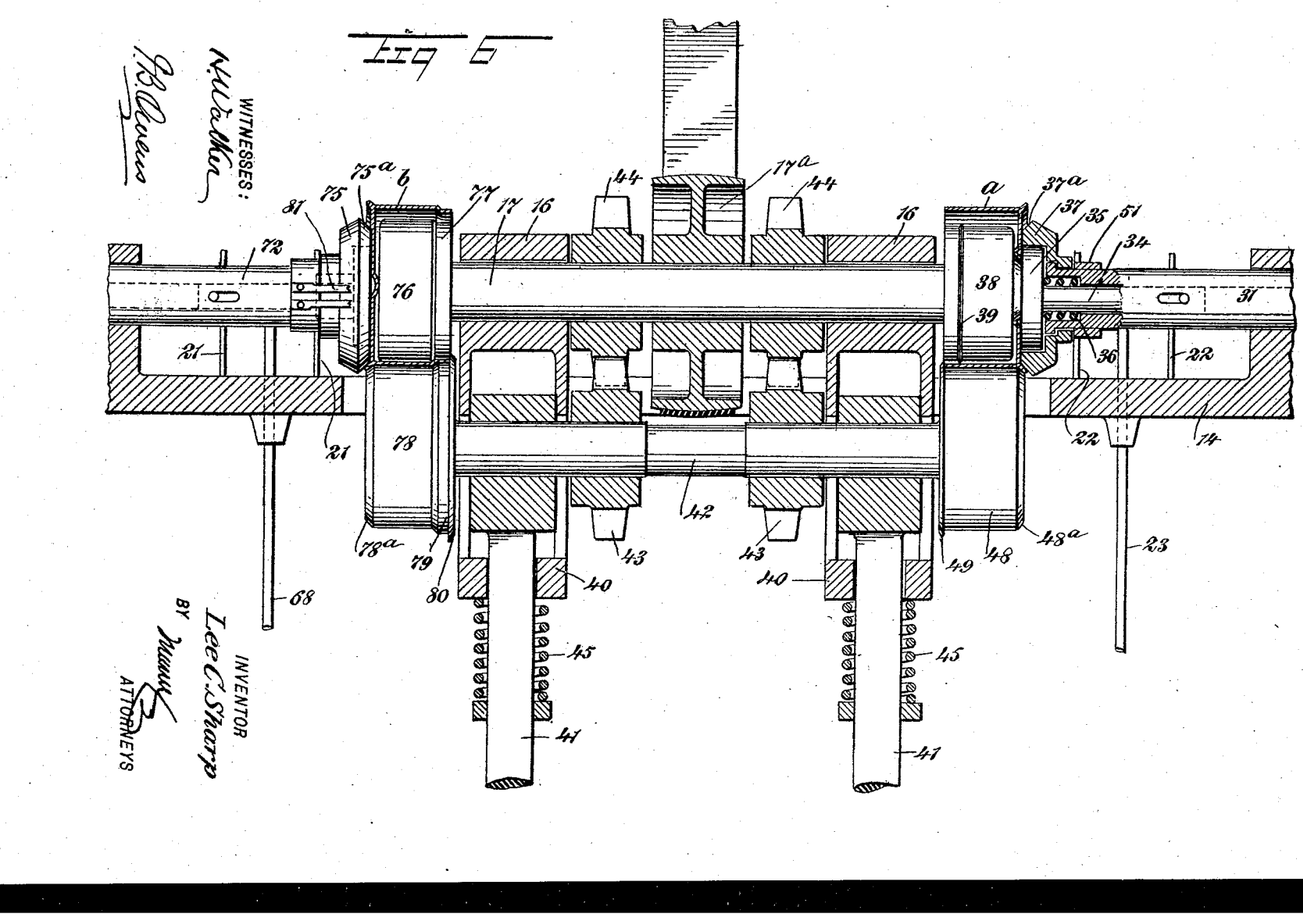
Fig. 6 is an enlarged detail section taken on the line 3 3 of Fig. 1.

37 indicates a swaging-roll which is revolubly carried on the inner end of the shaft 31 and which is counterbored, so that the head 35 may be received snugly therein, as indicated in Fig. 6. Carried fast on the right-hand end of the shaft 17 is a mandrel-roll 38, in which is placed an annular blade 39, the periphery of which projects very slightly beyond the periphery of the roll 38. As the pin 23 moves down and the pin 24 up, it allows the cans in the chute 22 to advance sufficiently to place one can in the before-described break in the chute, the pin 24 meanwhile acting to hold this can in place. The operation of the parts is timed so that this movement will take place when the shaft 31 is drawn outward beyond the line of the chute 22. Then as the shaft 31 returns the spring-pressed head 35 engages the can-section and moves it transversely, causing it to pass over the mandrel-roll 38. This movement of the shaft 31 continues until the can is snugly engaged with the mandrel-roll 38, and then the movement of the head 35 ceases, while the swaging-roll 37 continues on toward the can and assumes the position shown in Fig. 6.

The bearings 16 are formed with downwardly-projecting guides or hangers 40, in which hangers rods 41 are carried to move vertically. These rods move in true unison and have a shaft 42 revolubly carried in their upper ends, said shaft playing through slots in the hangers 40. (See Fig. 6.) The shaft 42 has pinions 43 fast thereon, and these pinions are in mesh with like gears 44, fast on the shaft 17, respectively, at the sides of the pulley $17^a$.

45 indicates springs which serve to press down the rods 41 and their connected parts, and the lower ends of these rods are connected to levers 46, which extend transversely and are engaged by cams 47, carried, respectively, on the shafts 20. These cams act periodically to throw up the rods 41, and they are of such form that they will cause the rods to dwell momentarily in their upward position.

Figure 3:
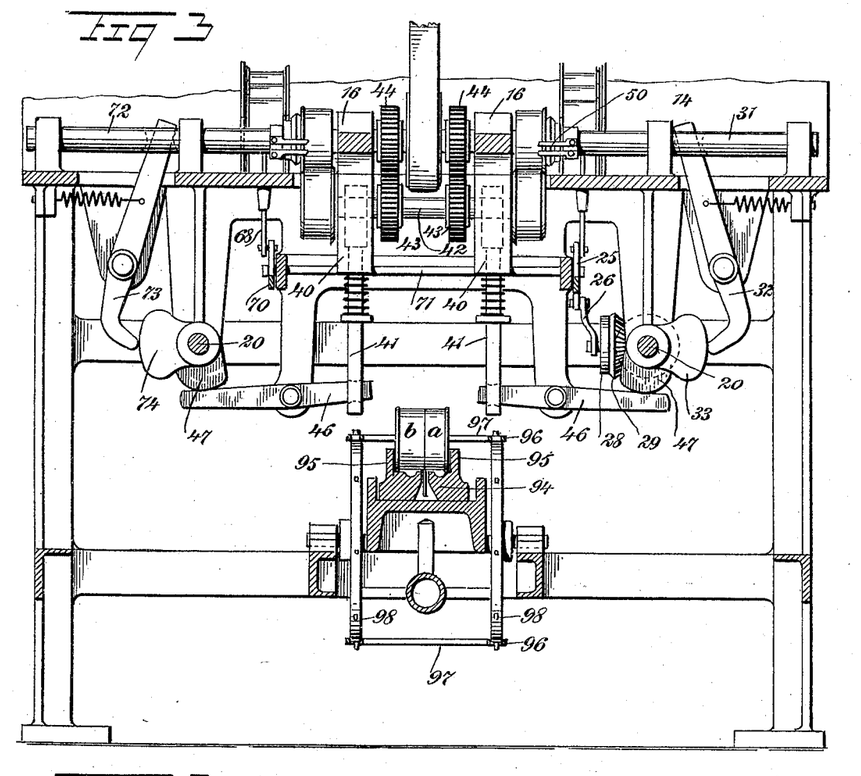
Fig. 3 is a transverse section on the line 3 3 of Fig. 1.

48 indicates a swaging-roll which is carried on the right-hand end of the shaft 42, and 49 indicates a circular trimming-knife which is fastened to the inner end of the roll 48. The swaging-rolls 37 and 48 have beveled faces $37^a$ and $48^a$, which stand approximately at an angle of forty-five degrees to the axes of the roll and work together, as shown in Fig. 6. The opposing surfaces of the rolls 48 and 38 are true cylinders. Under the action of the springs 45 and cams 47 the rods 41 are moved downward. This movement of the rods 41 is relatively slight—that is to say, it is not sufficient to completely disengage the gears 43 and 44. This downward movement of the rods 41 carries down the roll 48, and this operation is timed to take place the instant that the can-section $a$ is moved over the roll 38. The purpose of the downward movement of the roll 48 is to allow the can-section to be placed on the mandrel-roll. When the can-section has been moved up, as shown in Fig. 6, the roll 48 returns and the can-section is held tightly in the position shown. This operation takes place immediately before the roll 37 reaches the position shown in Fig. 6. The shafts 17 and 42 being continuously driven cause the can-section to take up their rotary movement, and the section is caused to spin between the rolls 38 and 48, the loose roll 37 following these movements. The results of this operation is threefold. The knife 49 trims the lower edge of the can-section, the blade 39 indents or slightly scores the inner surface of the can, producing the score-line $d$ in Figs. 9 and 10, and the surfaces $37^a$ and $48^a$ of the rolls 37 and 48 swage out the bead $c$, causing it to assume the form shown in Figs. 9 and 10. In this connection it may be remarked that in the dies a bead or rib is formed on the can-section; but this bead is perpendicular to the base of the can, whereas it is necessary that it stand at an angle thereto. The rolls 37 and 48 do not, therefore, actually form the bead, they merely swage it into its proper shape. When these operations have been performed, the parts 41, 42, and 48 move downward and the shaft 31 returns to its outward position. This return movement of the shaft 31 serves to carry back the can-section into the line of the chute 22, and this is effected by spring gripper-fingers 50, which are fastened to a collar 51 on the shaft 31. As the shaft moves inward the gripper-fingers are engaged with the bead on the can-section, and then as the shaft moves back it carries the can-section with it. The gripper-fingers, as shown in Fig. 3, are two at each side of the collar, and they are spaced apart, so that studs 52 on the outer wall of the chute 22 will pass between them and strike the top of the can-section, so as to disconnect it from the gripper-fingers 50, the shaft 31 continuing its rearward movement, so that the gripper-fingers fully clear the can-section. When this operation takes place, the stop-pin 24 is timed to move downward and the can-section is released and allowed to roll on down the chute to the next operation.

Figure 1:
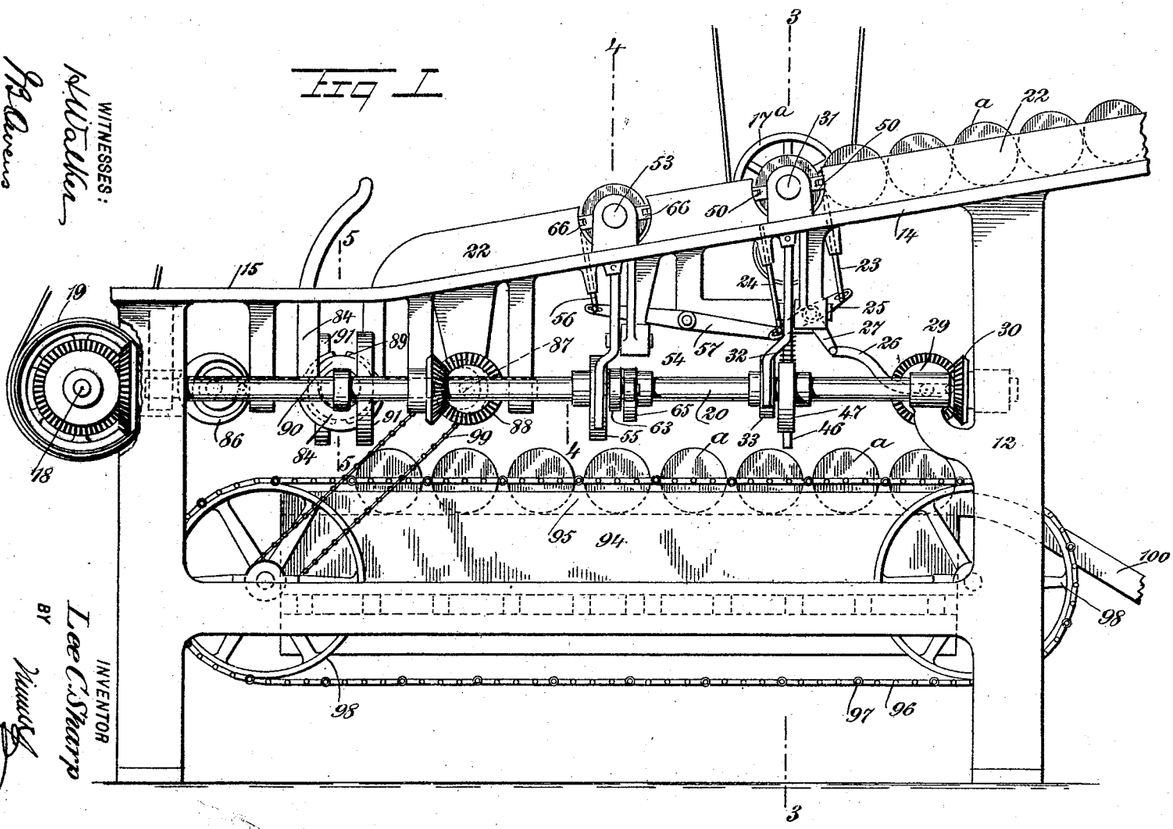
Figure 1 is a side elevation of a machine embodying my invention.
Figure 2:
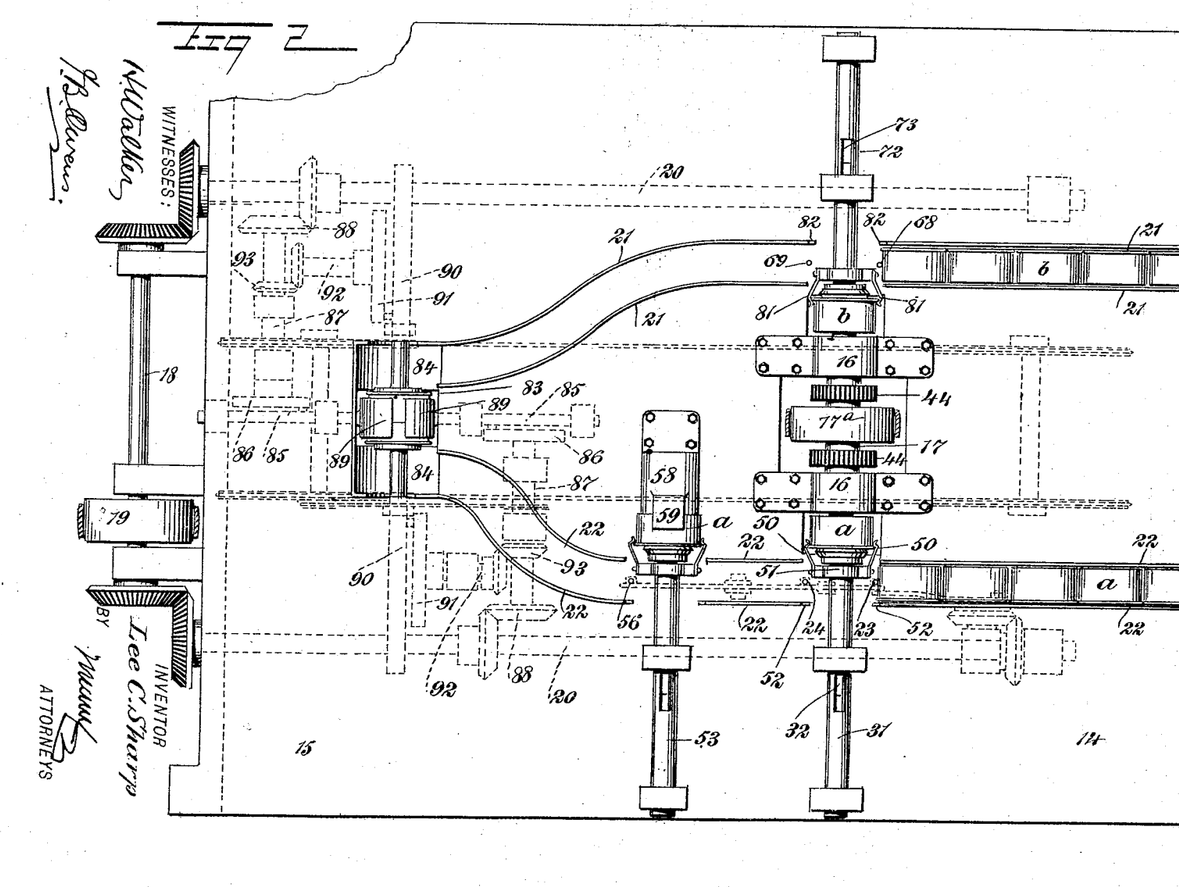
Fig. 2 is a plan view thereof.
Figure 4:
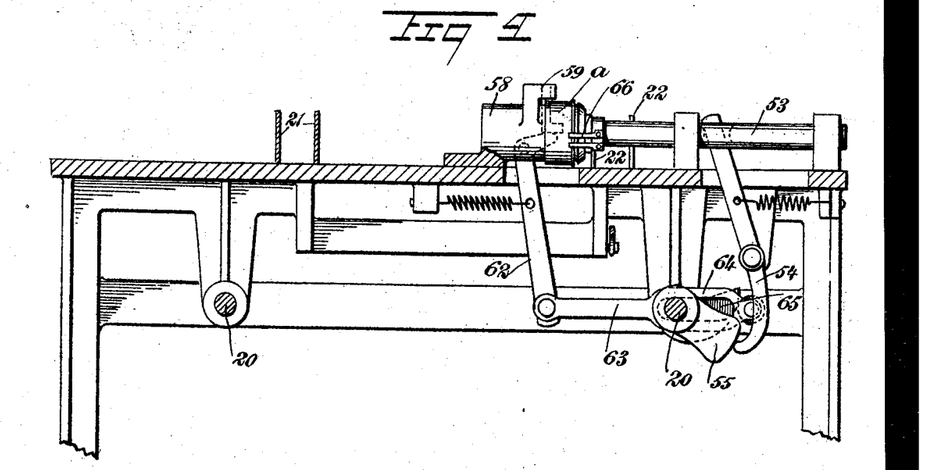
Fig. 4 is a transverse section on the line 4 4 of Fig. 1.
Figure 5:
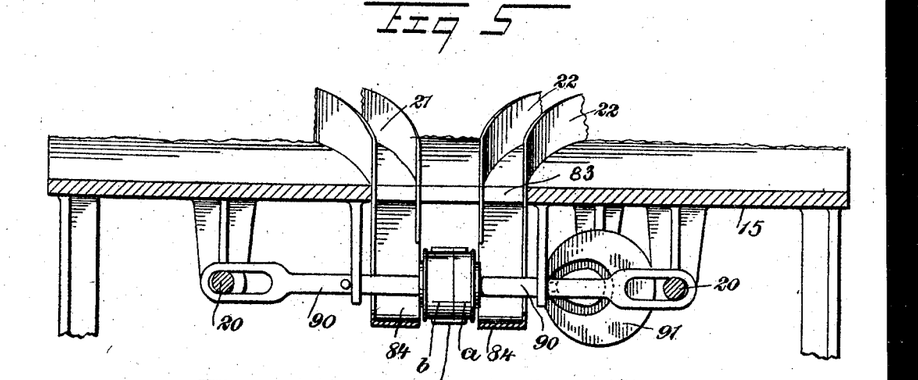
Fig. 5 is a transverse section on the line 5 5 of Fig. 1.
Figure 7:
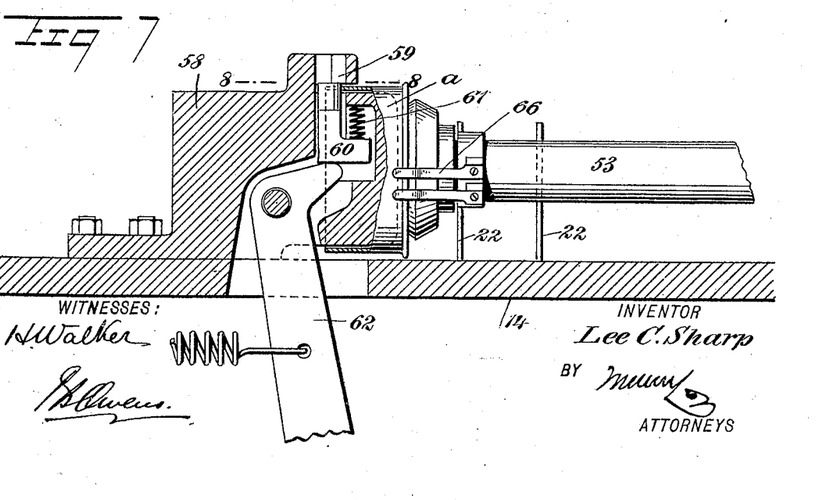
Fig. 7 is an enlarged detail section taken on the line 7 7 of Fig. 8.
Figure 8:
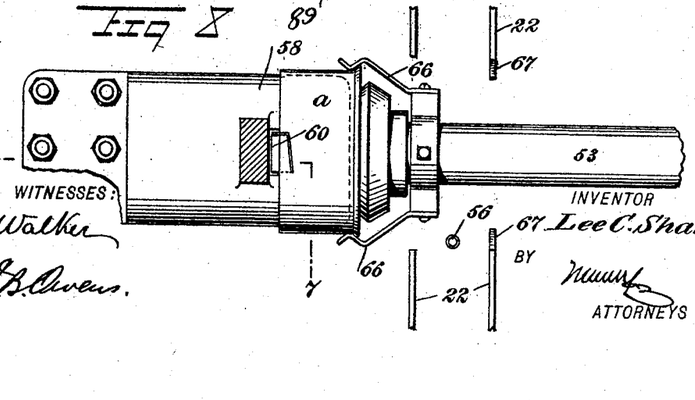
Fig. 8 is a sectional plan view on the line 8 8 of Fig. 7, and Figs. 9 and 10 are views illustrating the product of the machine.

The can-section $a$ having now been trimmed, scored, and swaged at the bead, it is next necessary to effect the cut which produces the tongue $e$. As shown in Figs. 2 and 4, a transverse shaft 53 is mounted on top of the table parallel with the shaft 31 and arranged to reciprocate transversely of the machine in the same manner as said shaft 31, the reciprocations of the shaft 53 being effected by a spring-pressed lever 54 and a cam 55, the latter being carried on the right-hand shaft 20. The shaft 53 is designed to move through a break in the chute 22, and at this break is located a stop-pin 56. The stop-pin 56 (see Fig. 1) is connected by a lever 57 with the rocker-arm 25 and derives its movement therefrom. As the can-section passes from the stop-pin 24 it is arrested by the pin 56, the shaft 53 having been previously withdrawn from the chute. The shaft 53 then moves inward to pass the can transversely into the position shown in Figs. 2 and 4. This shaft 53 may be provided with a spring-sustained plunger-head similar to the head 35 described with respect to the shaft 31. As shown best in Figs. 4, 7, and 8, a rigid horn 58 is mounted on the table in line with the shaft 53, and as the can-section $a$ is moved laterally it is passed over this horn and assumes the position shown in Figs. 7 and 8. The horn 58 carries a ledger-blade 59 and a shear-blade 60, which is pressed downward into inactive position by a spring 61 and upward into acting position by a spring-pressed elbow-lever 62, fulcrumed within the horn 58. The lever 62 projects downward and has a link 63 connected therewith, this link having a loop 64 sliding loosely on the right-hand shaft 20 and being driven by a cam 65 on said shaft. This cam is timed to throw the lever 62 and move upward the blade 60 immediately upon the can assuming the position shown in Fig. 7. The knife 60 therefore moves upward and effects the cut in the can, producing the tongue $e$, the knife being of course of such form as to make the cut of the form shown in Fig. 9. The parts 62 and 60 then return, and the shaft 53 begins its outward movement. The shaft 53 has gripper-fingers 66 thereon similar to the fingers 50, before described, and the chute 22 has projections 67, similar to the projections 52, before described. Therefore as the shaft 53 moves back it retracts the can-section $a$, and the can-section is then returned to the chute 22. The pin 56 is timed to be lowered at this period, and the can-section therefore passes down the chute and goes on to the parts of the machine which connect it with the bottom section $b$ and solder and seal the can.

I will now describe the individual operations on the bottom section $b$. The bottom section $b$ runs down the chute 21, and this chute has therein opposite the shaft 17 a break similar to the before-described break in the chute 22. Pins 68 and 69, similar to the pins 23 and 24, are placed in the chute 21 and are joined to a rocker-arm 70, similar to the rocker-arm 25. These two arms 25 and 70 are joined by a transverse shaft 71, and thus the pins 68 and 69 are driven.

72 indicates a transverse shaft similar to the shaft 31 and in axial line therewith. This shaft is driven reciprocally by a spring-pressed lever 73 and a cam 74, the cam being on the left-hand shaft 20. The inner end of the shaft 72 carries a swaging-roll 75, similar to the roll 37, and within this shaft works a spring plunger-head similar to the plunger-head 35. As the shaft 72 moves inward it moves the bottom section $b$ inward and places it on a mandrel-roll 76, carried at the left-hand end of the shaft 17. This mandrel 76 has at its inner end a reduced portion 77, and working with the mandrel-roll is a roll 78, carried on the left-hand end of the shaft 42. This roll 78 has an annular enlargement 79, matching with the reduced portion 77 of the roll 76, and the inner end of the roll 78 also carries a trimming-knife 80, similar to the knife 49. The can-section $b$ is moved onto the mandrel-roll 76 when the roll 78 is lowered, and then the roll 78 returns, and with the assistance of the rolls 75 and 76 the can-section is held firmly. As the parts 76 and 78 impart their movement to the can-section the bottom edge of the can-section is swaged in, producing the part $f$ in Figs. 9 and 10, this being effected by the reduced part 77 and the enlarged part 79. Simultaneously the knife 80 trims off the lower edge of the section, and the bevel-surfaces $78^{a}$ and $75^{a}$ swage out the bead $c$. The shaft 72 is fitted with gripper-arms 81, similar to the arms 50 and 66, before described, and as the shaft 42 moves down the shaft 72 moves out, and the gripper-fingers 81 carry back the can-section. Projections 82 on the chute 21 disengage the can, and since the pin 69 is lowered at this time the can-section rolls down the chute. It will be seen that by this operation the lower section $b$ is swaged out at the bead and swaged in at the sealing-strip $f$. It is also trimmed true at its lower edge. This completes the individual operations on the lower section of the can.

By the mechanism thus far described the can-sections are placed in condition for joining together. The chutes 21 and 22 converge at their lower portions and lead to an opening 83 in the table-section 15. The can-sections *a* and *b* drop through this opening and are caught in racks 84, lying beneath the top of the table. In these racks they are held in position to be moved together from the separated position (shown in Fig. 9) to the connected position. (Shown in Fig. 10.) Mounted to reciprocate longitudinally of the machine and carried beneath the table in axial line with each other are two shafts 85, to which proper movement is imparted by means of grooved cams 86, carried on shafts 87, these shafts running transversely toward each side of the machine and being connected by miter-gears 88 with the respective shafts 20. The adjacent ends of the plunger-shafts 85 carry essentially semicircular guides or formers 89, and under the action of the cams 86 the shafts are moved together in the position shown in Figs. 1 and 2. The guides 89 then lie between the racks 84, so that the can-sections may be moved toward each other between the guides and into engagement. This movement of the can-sections into engagement with each other is effected by transverse shafts 90, extending transversely in axial line with each other and reciprocal across the respective racks 84 into the position shown in Fig. 2. When in their outward position, the shafts 90 lie with their heads beyond the racks 84. The shafts 90 are driven by grooved cams 91, carried on shafts 92, running longitudinally of the machine and connected by miter-gears 93 with the shafts 87. The gearing is so arranged that the shafts 90 move back to allow the can-sections to fall into the respective racks 84. Then the guides 89 move up, so that the can-sections may be pushed between them, and finally the rods 90 move inward and slide the can-sections toward each other. They enter the guides 89, and finally they engage each other, the swaged portion or sealing-strip *f* passing into the top section *a*. This being done, the shafts 85 and 90 are retracted and the connected can falls between the racks 84 and by gravity passes to the soldering apparatus.

The soldering apparatus, as best shown in Fig. 3, comprises a soldering-table and appurtenances 94. This soldering apparatus is preferably of the form disclosed and claimed in my copending application for can forming and soldering machines, Serial No. 88,775, filed January 7, 1902. The table 94 extends longitudinally along the central lower portion of the machine and furnishes a track over which the can may be rolled whereby to apply solder to the seam. The table is also provided with longitudinal side guides 95, which hold the can properly in place. The table is formed with a solder-duct, and over this duct the seam of the can is passed. The cans are rolled over the solder-table by means of endless chains 96, to which are connected transverse bars 97, spaced apart a distance sufficient to permit a can between each of them. The chains 96 are carried on sprocket-wheels 98, arranged one at each end of the soldering apparatus and are driven by a sprocket-chain 99, passing from one of the shafts 87. (See the full lines in Fig. 1 and the dotted lines in Fig. 2.)

100 indicates a chute on which the finished cans are passed and down which they roll from the machine. In connection with the soldering apparatus I desire to explain that any suitable devices may be provided for applying a flux to the can. These devices are not illustrated in the drawings, since they form no part of the present invention and will be readily understood by all skilled mechanics.

The general operation of the entire machine may be traced as follows: The separate can-sections being placed in the chutes 21 and 22, they pass by gravity to the first stage of the machine—that is to say, at the point of the shafts 72, 17, and 31. Here the can-sections are arrested sufficiently to swage the bead *c*, trim the can-sections, form the score *d*, and swage the sealing-strip *f*. The can-section *b* then passes on directly to the rack 84 designed for it, and the can-section *a* passes to the point of the shaft 53, where the tongue *e* is formed. Then the can-section *a* passes to its rack and the can-sections are automatically moved together. The guide-plates 89 then retract and the can is dropped onto the soldering-table, after which it is rolled to apply the solder, and then the finished can passes from the machine. It will be observed that all of these actions are automatic and that the machine requires no attention whatever excepting to place the can-sections in their respective chutes. These chutes may be of sufficient length to enable great numbers of the can-sections to be placed therein, and thus the machine will not require attention except at relatively long periods.

Various changes in the form and details of my invention may be resorted to at will without departing from the spirit of my invention. Hence I consider myself entitled to all forms of the invention as may lie within the intent of my claims.

Having thus described my invention, I claim as new and desire to secure by Letters Patent—

1. The combination with means for performing operations on a can-section, of a shaft reciprocal toward and from the same, a roll carried to turn thereon and adapted to coöperate with said means, and a plunger-head yieldingly mounted on the shaft and projecting normally beyond the roll.

2. The combination with means for performing operations on a can-section, of a shaft reciprocal toward and from the same, a roll carried to turn thereon and adapted to coöperate with said means, a plunger-head yieldingly mounted on the shaft and projecting normally beyond the roll, and a gripper carried on the shaft to retract the can-section.

3. In a can-machine, the combination of a reciprocal member adapted to push a can-section in one direction, a gripper carried on said member and adapted to engage the can-section to move it back, and a stationary projection against which the can-section is moved to disengage it from the gripper.

4. In a can-machine, the combination of a horn, means for moving a can-section on and off the same, a blade carried by the horn, to cut the can-section, and means for working the blade.

5. In a can-machine, the combination of a roll having a blade extending around its periphery, and a second roll coacting therewith, said rolls having one an enlargement and the other a matching reduced portion located adjacent to the blade, whereby simultaneously to trim the can and swage a sealing-strip thereon.

6. In a can-machine, the combination of a roll having a blade extending around its periphery, and a second roll coacting therewith, said rolls having one an enlargement and the other a matching reduced portion located adjacent to the blade, the said enlargement being on the roll having the blade and being located directly adjacent thereto whereby simultaneously to trim the can and swage an inset sealing-strip thereon.

7. In a can-machine, the combination of a horn, means for moving a can-section on and off the same, a blade carried by the horn to cut the section, an elbow-lever extending into the horn and engaging the blade, and means for periodically actuating the elbow-lever.

8. In a can-machine, the combination with a framing, of a shaft mounted therein, rolls carried on the ends of said shaft and adapted to carry the can-sections, a second shaft mounted to move laterally toward and from the first-named shaft, rolls carried on the second-named shaft and coacting with the first-named rolls, means for moving the can-sections on and off of the first-named rolls, a drive-shaft located at each side of the frame, mechanism operated from the respective drive-shafts for driving the said means for moving the can-sections on and off the first-named rolls, and mechanism simultaneously actuated from both of said drive-shafts for moving the second-named shaft toward and from the first-named shaft.

9. The combination of a revoluble drive-shaft mounted intermediate its ends, a roll on each end of the said shaft, a second shaft revolubly mounted intermediately of its ends alongside of the drive-shaft and also movable laterally toward and from the drive-shaft, means for revolving the second shaft from the drive-shaft, and a roll carried on each end of the second shaft and respectively coacting with the first-named rolls.

10. The combination of a revoluble drive-shaft mounted intermediate its ends, a roll on each end of the said shaft, a second shaft revolubly mounted intermediately of its ends alongside of the drive-shaft and also movable laterally toward and from the drive-shaft, means for revolving the second shaft from the drive-shaft, a roll carried on each end of the second shaft and respectively coacting with the first-named rolls, and means for automatically and periodically moving the second shaft laterally.

11. The combination of a revoluble drive-shaft mounted intermediate its ends, a roll on each end of the said shaft, a second shaft revolubly mounted intermediately of its ends alongside of the drive-shaft and also movable laterally toward and from the drive-shaft, means for revolving the second shaft from the drive-shaft, a roll carried on each end of the second shaft and respectively coacting with the first-named rolls, means for automatically and periodically moving the second shaft laterally, and means for automatically and approximately simultaneously moving work onto and off of the said rolls of the drive-shaft.

12. The combination of a revoluble drive-shaft mounted intermediate its ends, a roll on each end of the said shaft, a second shaft revolubly mounted intermediately of its ends alongside of the drive-shaft and also movable laterally toward and from the drive-shaft, means for revolving the second shaft from the drive-shaft, a roll carried on each end of the second shaft and respectively coacting with the first-named rolls, means for automatically and periodically moving the second shaft laterally, and means for automatically and approximately simultaneously moving work onto and off of the said rolls of the drive-shaft, the means for moving the work acting synchronously with the means for laterally moving the second shaft.

13. The combination of a revoluble drive-shaft mounted intermediate its ends, a roll on each end of the said shaft, a second shaft revolubly mounted intermediately of its ends alongside of the drive-shaft and also movable laterally toward and from the drive-shaft, means for revolving the second shaft from the drive-shaft, a roll carried on each end of the second shaft and respectively coacting with the first-named rolls, means for automatically and periodically moving the second shaft laterally, means for automatically and approximately simultaneously moving work onto and off of the said rolls of the drive-shaft, the said means for moving the work comprising each a driven plunger to advance the work, and a gripper moving with the plunger and engaging the work to retract it upon the return of the plunger.

14. The combination of a roll mounted to turn, a plunger movable toward and from the roll, said plunger engaging the work to move it onto the roll, a gripper connected to move with the plunger and engaging the work to retract it upon the return of the plunger, a second roll coacting with the first and movable toward and from the same, and means for so moving the second roll, said means working synchronously with the plunger.

15. In a can-machine, the combination of a roll, a second roll mounted to move laterally toward and from the first, said rolls coacting to perform one operation on the can-section, and a third roll movable toward and from the first roll to move the can-section onto the first roll, said third roll coacting with the other two rolls simultaneously to perform a second operation on the can-section.

16. In a can-machine, the combination of two rolls adapted to spin the can-sections between them, and an annular knife carried on the roll intermediate its ends and adapted to work on the interior of the can-section to form an annular score therein, the other roll having a plane surface opposing said annular knife.

17. In a can-machine, the combination of two mounted and driven rolls lying opposite each other to turn a can-section between them, and an annular knife attached to the inner end of one roll and working against the inner end of the other roll to trim off the end of the can-section, said rolls having essentially cylindrical coacting surfaces lying outward from the knife and adapted to engage the body of the can-section to turn the same, and said rolls also having one an annular enlargement and the other a matching reduced portion lying adjacent to and outward from the knife, whereby to swage a sealing-strip on the can-section simultaneously with the trimming thereof.

18. In a can-machine, the combination of two mounted and driven rolls lying opposite each other to turn a can-section between them, and an annular knife attached to one roll and coacting with the other to trim off the end of the can-section, the rolls having the one an annular enlargement and the other a matching reduction, said enlargement and reduction lying outward from the knife, whereby to swage a sealing-strip on the can-section simultaneously with the trimming thereof.

19. In a can-machine the combination of two mounted rolls lying opposite each other to turn a can-section between them, a knife attached to one of said rolls to trim off the end of the can-section, a third roll movable toward and from the two rolls first named, said third roll and one of the first-named rolls having coacting beveled surfaces capable of working on the edge of the can-section to form a bead thereon simultaneously with the trimming operation, and means for driving the rolls.

20. In a can-machine the combination of two mounted rolls lying opposite each other to turn a can-section between them, a knife attached to one of said rolls to trim off the end of the can-section, a third roll movable toward and from the two rolls first named, said third roll and one of the first-named rolls having coacting beveled surfaces capable of working on the edge of the can-section to form a bead thereon simultaneously with the trimming operation, and means for driving the rolls, the two first-named rolls having respectively an annular enlargement and an annular reduction matching to form a sealing-strip on the can-section simultaneously with the trimming and beading operation.

21. In a can-machine, the combination of two mounted rolls lying opposite each other to turn a can-section between them, a third roll lying opposite the end of one of the first-named rolls, the other of the first-named rolls and the said third roll having matching beveled portions capable of working on the edge of the can-section to form a bead thereon, and means for driving the rolls.

22. In a can-machine, the combination of two mounted and driven rolls lying opposite each other to turn a can-section between them, an annular knife attached to one roll and coacting with the other to trim off the end of the can-section, the rolls having the one an annular enlargement and the other a matching reduction, said enlargement and reduction lying outward from the knife, whereby to swage a sealing-strip on the can-section simultaneously with the trimming thereof, and means for automatically moving the can-section on and off of one of said rolls.

23. In a can-machine, the combination of two mounted rolls lying opposite each other to turn a can-section between them, a knife attached to one of said rolls to trim off the end of the can-section, a third roll movable toward and from the two rolls first named, said third roll and one of the first-named rolls having coacting beveled surfaces capable of working on the edge of the can-section to form a bead thereon simultaneously with the trimming operation, means for driving the rolls, and means for automatically moving the can-section in and out of engagement with said rolls.

24. The combination of two rolls having parallel longitudinal faces lying side by side, whereby a can-section may be placed on one roll and the sides of said can-section turned between the said faces of the rolls, a third roll lying end to end with one of the first-named rolls, the other of the first-named rolls and the said third roll having coacting beveled surfaces adapted to act on the edge of the can-section to form a bead thereon, and means for mounting and operating the rolls.

25. In a can-machine, the combination with the frame, of bearings mounted thereon, said bearings having laterally-extending hangers, a drive-shaft mounted in the bearings, boxes fitted to slide in the hangers toward and from the drive-shaft, a shaft arranged to turn in the boxes, means for driving the second-named shaft from the drive-shaft, means for automatically and periodically sliding the boxes in the hangers, and coacting tools carried respectively on the said shafts.

26. In a can-machine, the combination with the frame, of bearings mounted thereon, said bearings having laterally-extending hangers, a drive-shaft mounted in the bearings, boxes fitted to slide in the hangers toward and from the drive-shaft, a shaft arranged to turn in the boxes, means for driving the second-named shaft from the drive-shaft, means for automatically and periodically sliding the boxes in the hangers, coacting tools carried respectively on the said shafts, and means for automatically moving the work into and out of engagement with the tools, said means acting synchronously with the means for sliding the boxes in the hangers.

27. In a can-machine, the combination with the frame, of a rotary drive-shaft mounted thereon, a second rotary shaft mounted to move laterally toward and from the drive-shaft, means for automatically and periodically moving said second shaft toward and from the drive-shaft, means for driving the second shaft from the drive-shaft, and coacting tools carried respectively on the said shafts and capable of holding and working the can-section between them.

28. In a can-machine, the combination with the frame, of a rotary drive-shaft mounted thereon, a second rotary shaft mounted to move laterally toward and from the drive-shaft, means for automatically and periodically moving said second shaft toward and from the drive-shaft, means for driving the second shaft from the drive-shaft, coacting tools carried respectively on the said shafts and capable of holding and working the can-section between them, and means for automatically moving the can-section into and out of engagement with the tools, said means acting synchronously with the means for laterally moving the second-named shaft.

29. In a can-machine, the combination of two rolls adapted to spin the can-section between them, an annular knife carried on one roll intermediate its ends and adapted to work on the interior of the can-section to form an annular score therein, the other roll having a plane surface opposing said annular knife, and a second annular knife fastened to said other roll and overlapping the adjacent face of the first-named roll, whereby they trim the can-section simultaneously with the formation of said score.

30. In a machine for forming and assembling the sections of a two-piece can, the combination of two guideways, means at each guideway for trimming the can-sections and for swaging one of said sections to permit the sections to be engaged together, an additional means at one of said guideways for cutting an opening-tongue on one of the can-sections, and means working at the discharge ends of the chutes for engaging two opposite can-sections and forcing them into connection with each other.

31. In a machine for assembling the two sections of a two-part can, the combination of two chutes through which the separated can-sections are moved, means adjacent to one chute for automatically swaging one of the can-sections to permit the sections to be engaged together, means adjacent to the other chute for automatically trimming the other can-section and means at the discharge ends of the chutes for engaging the two opposing can-sections and automatically moving them into connection with each other.

32. In a machine for assembling the two sections of a two-part can, the combination of two chutes through which the cans are run, means at each chute for automatically trimming the can-sections, and means at the discharge ends of the chutes for engaging the can-sections and pushing them into connection with each other.

33. In a machine for assembling the two sections of a two-part can, the combination with the framing, of two chutes or guideways through which the separate can-sections are run, means at each chute or guideway for automatically performing individual operations on the can-sections, said means fitting said can-sections for direct engagement with each other, and devices at the discharging ends of the chutes or guideways for automatically moving the said can-sections into direct connection with each other.

34. In an organized machine for assembling the two parts of a two-part can, the combination with a framing of means for performing preliminary operations on the two can parts, such means fitting the can parts for direct engagement with each other, means for forcing said can parts into direct engagement with each other, means for securing said engaged can-sections together to form the finished can and gearing connecting and driving all of said means in unison.

35. In an organized machine for assembling the two parts of a two-part can, the combination with a framing, of means for forcing said two parts of the can into direct engagement with each other, means for securing said engaged can-sections together to form the finished can, and gearing connecting and driving all of said means in unison.

36. In an organized machine for assembling the two parts of a two-part can, the combination of means for automatically trimming the can parts at their meeting ends and for swaging one of said parts to permit the parts to be engaged together, means for so engaging the parts, and gearing for driving all of said means in unison.

37. In an organized machine for forming and assembling the parts of a two-part can, the combination of means for automatically trimming the meeting edges of the can parts, for inwardly swaging one of said parts to permit the parts to be engaged together, and for cutting an opening-tongue on the other part, means for so engaging the parts together, and gearing for driving all of said means in unison.

38. In an organized machine for forming and assembling the parts of a two-part can, the combination of means for trimming the meeting edges of the can parts, means for moving said can parts into direct engagement with each other, and gearing for driving all of said means in unison.

39. In a machine for assembling the two parts of a two-part can, the combination of two oppositely-situated spaced can-part receiving-racks, means for separately delivering the can parts thereto, guides movable toward and from each other between the racks and matching to receive the can between them, plungers movable through the racks to force the can-sections from the racks into the guides and into direct engagement with each other to form the complete can, and gearing for driving the operative parts in unison.

40. In a machine for assembling the two parts of a two-part can, the combination of two oppositely-situated spaced can-part receiving-racks, guides movable toward and from each other between the racks and matching to receive the can between them, plungers movable through the racks to force the can-sections from the racks into the guides and into direct engagement with each other to form the complete can, and gearing for driving the operative parts in unison.

In testimony whereof I have signed my name to this specification in the presence of two subscribing witnesses.

LEE C. SHARP.

Witnesses:
 I. B. OWENS,
 JNO. M. RITTER.